United States Patent
Lu (10) Patent No.: US 11,922,300 B2
(45) Date of Patent: Mar. 5, 2024

(54) AUTOMATED COMMENTARY FOR ONLINE CONTENT

(71) Applicant: MICROSOFT TECHNOLOGY LICENSING, LLC, Redmond, WA (US)

(72) Inventor: Yumao Lu, Beijing (CN)

(73) Assignee: Microsoft Technology Licensing, LLC., Redmond, WA (US)

( * ) Notice: Subject to any disclaimer, the term of this patent is extended or adjusted under 35 U.S.C. 154(b) by 1274 days.

(21) Appl. No.: 16/076,703

(22) PCT Filed: Mar. 1, 2016

(86) PCT No.: PCT/CN2016/075186
§ 371 (c)(1),
(2) Date: Aug. 9, 2018

(87) PCT Pub. No.: WO2017/147785
PCT Pub. Date: Sep. 8, 2017

(65) Prior Publication Data
US 2019/0050731 A1    Feb. 14, 2019

(51) Int. Cl.
*G06N 3/08* (2023.01)
*G06F 16/332* (2019.01)
(Continued)

(52) U.S. Cl.
CPC ............ *G06N 3/08* (2013.01); *G06F 16/3329* (2019.01); *G06F 16/337* (2019.01);
(Continued)

(58) Field of Classification Search
CPC ...... G06N 3/08; G06N 3/0445; G06F 16/353; G06F 16/337; G06F 16/3329; G06F 40/56; H04L 51/02
See application file for complete search history.

(56) References Cited

U.S. PATENT DOCUMENTS

| 6,453,303 B1 * | 9/2002 | Li | G06Q 40/02 |
| | | | 705/36 R |
| 7,873,567 B2 * | 1/2011 | Eder | G06Q 40/04 |
| | | | 705/37 |

(Continued)

FOREIGN PATENT DOCUMENTS

| CN | 101667194 A | 3/2010 |
| CN | 104657347 A | 5/2015 |
| WO | 2016000555 A1 | 1/2016 |

OTHER PUBLICATIONS

Cho, et al., "Learning Phrase Representations using RNN Encoder-Decoder for Statistical Machine Translation", In Proceedings of Conference on Empirical Methods in Natural Language Processing, Oct. 25, 2014, pp. 1724-1734.

(Continued)

*Primary Examiner* — Ninos Donabed
(74) *Attorney, Agent, or Firm* — Barta Jones, PLLC (57) ABSTRACT

Techniques for artificially generating commentary for online content including news items. In an aspect, a personification engine incorporates a machine learning model trained using corpus elements comprising an item of online content and relevant commentary. The personification engine is configured to generate relevant commentary when provided with an item of online content such as a news item. In a further aspect, a chatbot engine incorporates a model similarly trained using corpus element comprising a comment and a relevant response. The chatbot engine is configured to generate relevant responses to user comments in the context of a forum or comments section related to the item of online content.

20 Claims, 7 Drawing Sheets

(51) Int. Cl.
  *G06F 16/335* (2019.01)
  *G06F 16/35* (2019.01)
  *G06F 40/56* (2020.01)
  *G06N 3/044* (2023.01)
  *H04L 51/02* (2022.01)

(52) U.S. Cl.
  CPC ............ *G06F 16/353* (2019.01); *G06F 40/56* (2020.01); *G06N 3/044* (2023.01); *H04L 51/02* (2013.01)

(56) References Cited

U.S. PATENT DOCUMENTS

| | | | |
|---|---|---|---|
| 7,970,640 B2 * | 6/2011 | Eder | G06Q 10/0635 705/7.28 |
| 8,103,650 B1 * | 1/2012 | Kauchak | G06F 16/353 707/706 |
| 8,498,915 B2 * | 7/2013 | Eder | G06Q 40/06 705/37 |
| 9,094,730 B1 * | 7/2015 | Kirmse | H04N 21/41407 |
| 9,842,101 B2 * | 12/2017 | Wang | G06F 40/274 |
| 11,025,565 B2 * | 6/2021 | Sridhar | H04L 51/02 |
| 2005/0086647 A1 * | 4/2005 | Ito | G06F 8/75 717/133 |
| 2008/0109784 A1 * | 5/2008 | Levine | G06F 40/143 717/106 |
| 2008/0215571 A1 * | 9/2008 | Huang | G06F 16/345 707/999.005 |
| 2009/0018891 A1 * | 1/2009 | Eder | G06Q 10/0635 705/7.29 |
| 2009/0112989 A1 | 4/2009 | Anderson et al. | |
| 2009/0319436 A1 | 12/2009 | Andra et al. | |
| 2010/0299301 A1 | 11/2010 | Busch et al. | |
| 2011/0047213 A1 | 2/2011 | Manuel | |
| 2011/0106895 A1 * | 5/2011 | Ventilla | H04L 12/66 709/204 |
| 2011/0137726 A1 | 6/2011 | Amatriain et al. | |
| 2011/0209043 A1 | 8/2011 | Guo et al. | |
| 2011/0270774 A1 | 11/2011 | Varshavsky et al. | |
| 2013/0204833 A1 | 8/2013 | Pang et al. | |
| 2013/0226847 A1 * | 8/2013 | Cruse | G06N 5/04 706/12 |
| 2013/0268620 A1 | 10/2013 | Osminer | |
| 2013/0316834 A1 * | 11/2013 | Vogel | G06Q 10/06375 463/42 |
| 2014/0122618 A1 * | 5/2014 | Duan | H04L 51/02 709/206 |
| 2014/0172893 A1 | 6/2014 | Carter | |
| 2015/0062590 A1 * | 3/2015 | Bagherinia | G01B 9/02091 356/479 |
| 2015/0082277 A1 * | 3/2015 | Champlin-Scharff | G06F 11/3664 717/120 |
| 2015/0095770 A1 * | 4/2015 | Mani | G06F 40/12 715/254 |
| 2015/0100599 A1 | 4/2015 | Ramakrishnan et al. | |
| 2015/0293988 A1 | 10/2015 | Eubanks | |
| 2015/0304269 A1 | 10/2015 | Keerthi et al. | |
| 2016/0041985 A1 * | 2/2016 | Manterach | G06F 16/93 707/727 |
| 2016/0171514 A1 * | 6/2016 | Frank | G06Q 30/02 705/7.29 |
| 2016/0299906 A1 * | 10/2016 | Cartoon | G06F 16/4387 |
| 2017/0185583 A1 * | 6/2017 | Pino | G06F 40/289 |
| 2017/0249384 A1 * | 8/2017 | Kandylas | G06F 16/358 |
| 2018/0285818 A1 * | 10/2018 | Soltani | G06Q 50/01 |
| 2018/0357221 A1 * | 12/2018 | Galitsky | G06F 40/289 |
| 2019/0188701 A1 * | 6/2019 | Parsons | H04L 9/14 |
| 2021/0150155 A1 * | 5/2021 | Kim | H04L 51/02 |

OTHER PUBLICATIONS

Xue, et al., "An Effective News Recommendation in Social Media based on Users' Preference", In Proceedings of International Workshop on Education Technology and Training & International Workshop on Geoscience and Remote Sensing, Dec. 21, 2008, pp. 627-631.

"International Search Report and Written Opinion Issued in PCT Application No. PCT/CN2016/075186", dated Nov. 30, 2016, 5 Pages.

Xie, et al., "Analyze and Recommend News Comments in E-Government", In Proceedings of International Conference on E-Business and E-Government, May 7, 2010, pp. 451-453.

\* cited by examiner

AUTOMATED COMMENTARY FOR ONLINE CONTENT

BACKGROUND

Internet users require the assistance of machines to organize and identify relevant content on the Internet. For example, search engines are designed to process queries and match users with online content most relevant to their queries. In the absence of explicit user queries, recommendation engines may identify online content such as recent news articles, and initiate recommendations to users based on their characteristics, such as gender, age, interests, etc.

When presenting a recommendation to users, current recommendation engines do little more than display the content, e.g., news article, to the targeted user, without further commentary or summary of the content's relevance to the user. Without such commentary, users are likely to ignore or miss the recommended content, and the content is unlikely to attract a great deal of attention. While human annotators may be employed to provide such specific commentary to each article, such manual procedures may be costly and difficult to scale.

Accordingly, it would be desirable to provide cost-effective and scalable techniques for generating relevant commentary when recommending online content to users.

DETAILED DESCRIPTION

Various aspects of the technology described herein are generally directed towards techniques for artificially generating relevant commentary for online content recommendations.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

While illustrative aspects of the present disclosure may be described with reference to specific online content such as news articles, it will be appreciated that the techniques of the present disclosure may be broadly applicable to other types of content recommendations as well. For example, movies, journal papers, non-text media such as videos or images, or other types of non-real-time content such as recommendations of food recipes or other items of interest may readily incorporate the techniques disclosed herein. Such alternative exemplary embodiments are contemplated to be within the scope of the present disclosure.

Figure 1:
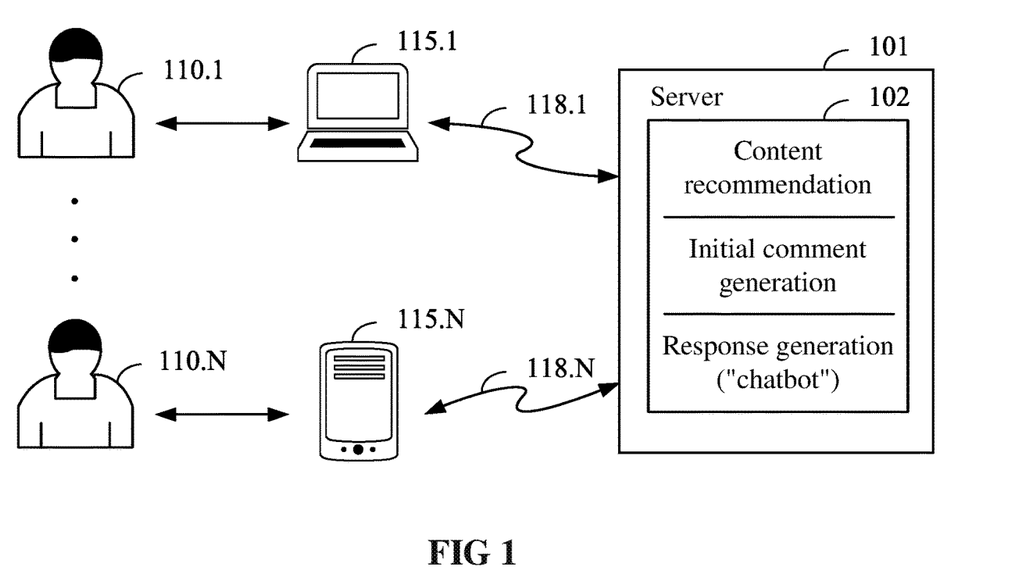
FIG. 1 illustrates an exemplary scenario wherein techniques of the present disclosure may be applied.

FIG. 1 illustrates an exemplary scenario wherein techniques of the present disclosure may be applied. Note FIG. 1 is shown for illustrative purposes only, and is not meant to limit the scope of the present disclosure to any particular scenarios shown.

In FIG. 1, a server 101 is provided for automatically generating commentary on online content recommendations targeted to one or more users 110.1 through 110.N. In particular, server 101 may include hardware and software resources 102 for selecting online content such as news articles for recommendation to a target group of users, automatically generating commentary on the selected content, and further automatically generating additional commentary in response to user-posted comments and/or replies (e.g., a "chatbot"), as further described hereinbelow.

Server 101 may communicate with a plurality of users 110.1 through 110.N through various types of user devices. For example, user 110.1 may access the Internet via a personal computer 115.1 over a wired or wireless connection 118.1, while user 110.N may access the Internet via a smartphone 115.N over a wireless connection 118.N, etc.

Figure 2:
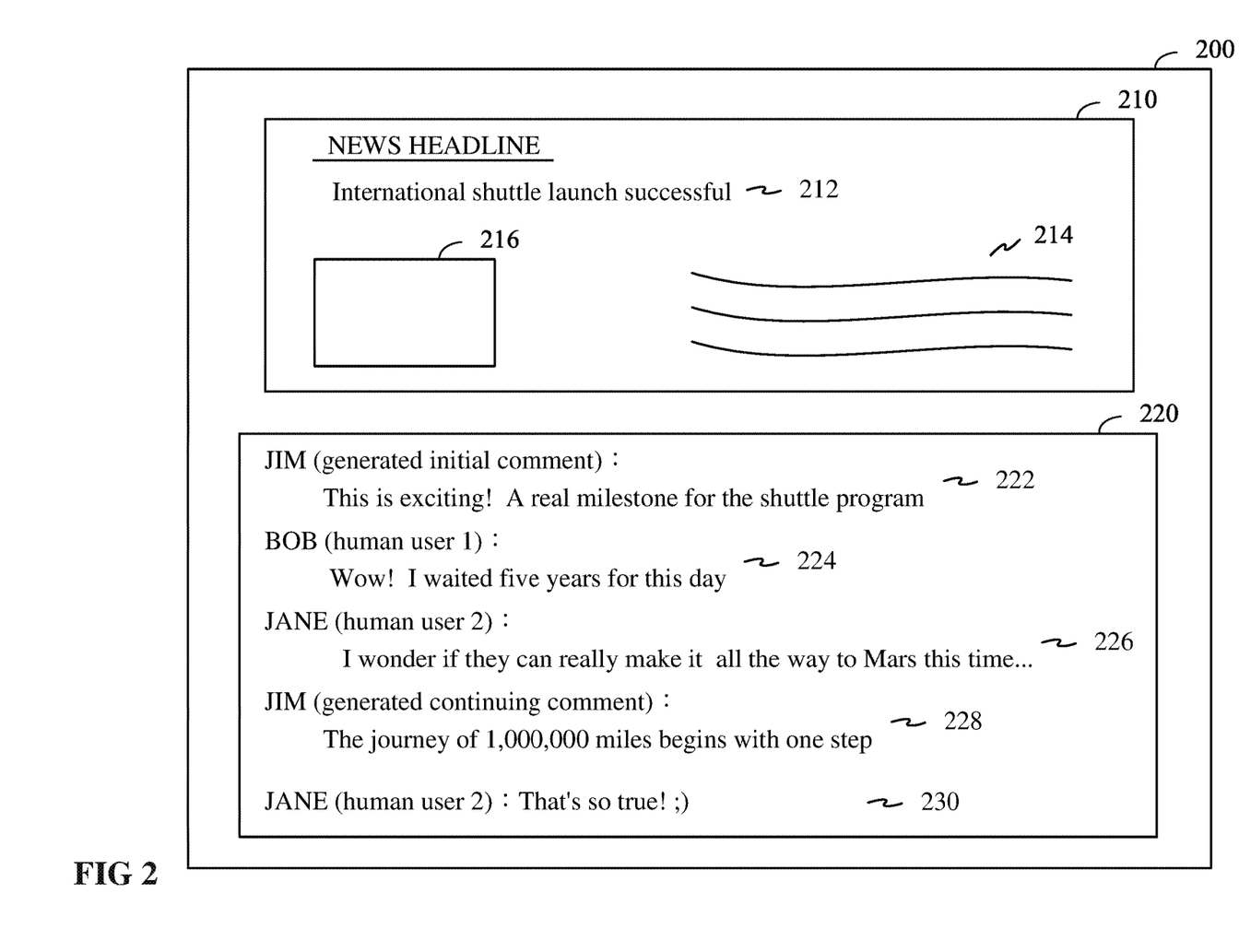
FIG. 2 illustrates an illustrative screenshot of an exemplary user interface for a news recommendation system provided on a user device such as the personal computer or smartphone in FIG. 1.

FIG. 2 illustrates an illustrative screenshot of an exemplary user interface 200 for a news recommendation system provided on a user device such as personal computer 115.1 or smartphone 115.N in FIG. 1. Note FIG. 2 is shown for illustrative purposes only, and is not meant to limit the scope of the present disclosure to any particular types of user interfaces or any particular types of online content.

It will be appreciated that alternative exemplary embodiments, e.g., directed to online content other than news articles, may readily adopt user interfaces similar to that shown for user interface 200 for news articles, and such alternative exemplary embodiments are contemplated to be within the scope of the present disclosure.

In FIG. 2, a user is presented a recommended news article 210 through user interface 200. Article 210 includes, e.g., a headline 212 (e.g., "International shuttle launch successful" in FIG. 2), text 214, one or more images 216, etc. User interface 200 also includes a forum or comments section 220, showing a plurality of comments 222, 224, 226, 228, 230 pertaining to the news article.

In particular, an initial comment 222 may be artificially generated by a personification engine, according to techniques of the present disclosure. In an exemplary embodiment, generated initial comment 222 may correspond to a natural-language segment of text relating to the subject matter of news article 210, that is meant to stimulate further discussion of the news article by other human users. In an exemplary embodiment, the automatically generated comment 220 may be attributed to an artificial personality, illustratively shown in FIG. 2 as "Jim," to emulate the characteristics of a human leader of forum or comments section 215.

Additional comments 224, 226 are shown posted by human users Bob and Jane, respectively. In certain exemplary embodiments, the artificial personality Jim generates a continuing comment 228 that is intended to carry forward a continuing conversation already started by users, or to re-start a conversation that has stalled.

Techniques for designing an artificial intelligence engine for generating an artificial initial comment based on an item of online content, such as a news article, and for further sustaining a user conversation related to the item of online content, will be further described hereinbelow with reference to FIG. 3.

Figure 3:
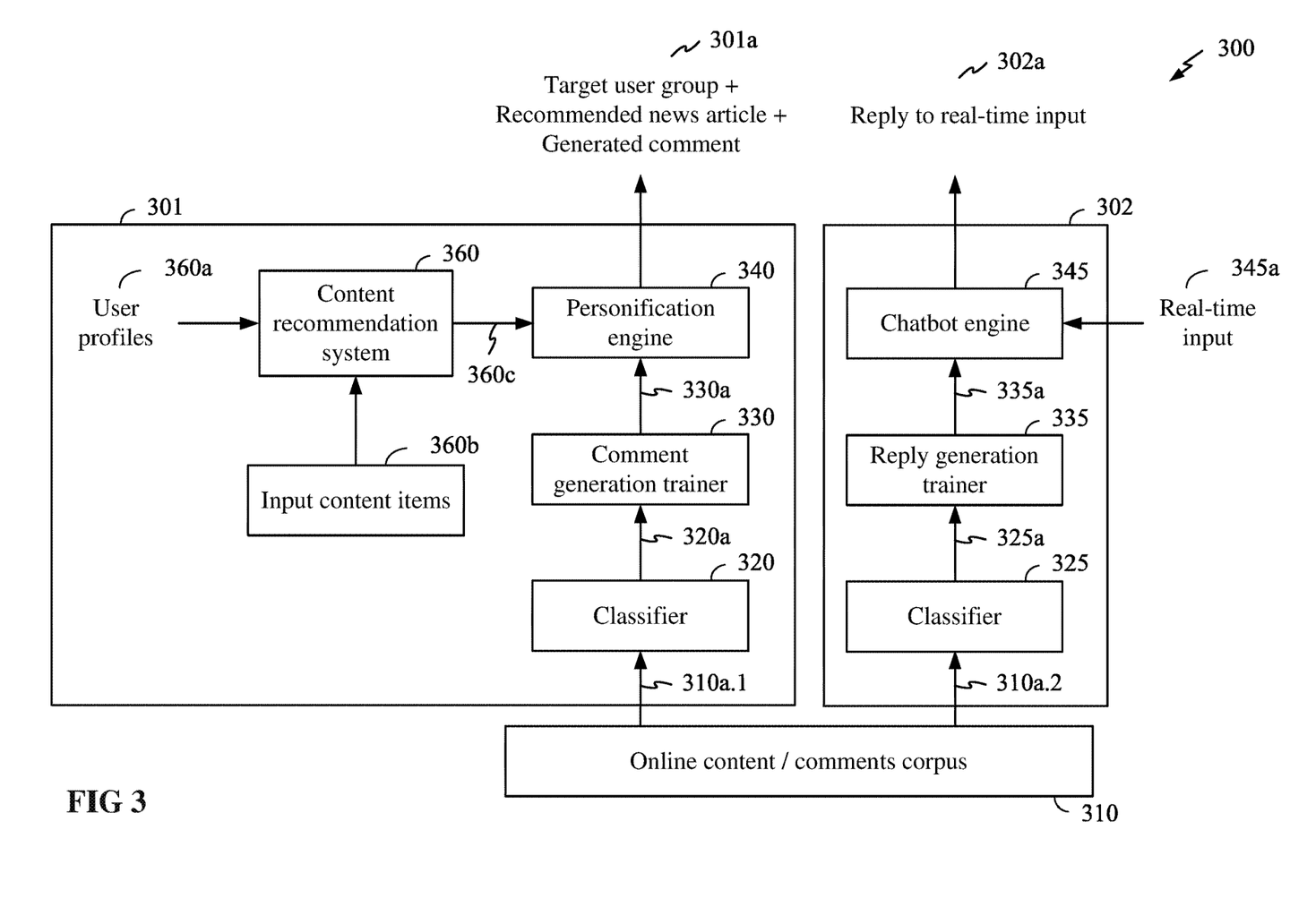
FIG. 3 shows an overall architecture of an artificial intelligence system for generating initial and continuing comments related to an item of online content such as a news article.

In particular, FIG. 3 shows an overall architecture 300 of an artificial intelligence system for generating initial and continuing comments related to an item of online content such as a news article. Note FIG. 3 is shown for illustrative purposes only, and is not meant to limit the scope of the present disclosure to any particular implementations of the artificial intelligence system described herein.

In FIG. 3, system 300 includes an initial comment generation module 301 and a continuation comment generation module 302. Each of modules 301, 302 have access to a corpus 300 for training artificial intelligence models implemented by the modules. Corpus 300 may contain, e.g., instances of the online content, such as news articles/items, and comments relating to those instances of online content. In an exemplary embodiment, corpus 300 may include articles, postings, comments, "likes," re-postings, etc., as extracted from online content sources. In the exemplary embodiment of a news recommendation system, such sources may include major and small or independent news outlets, Facebook, Twitter, Yahoo News, Bing News, etc.

In an exemplary embodiment, corpus 300 may be organized by each individual item of content, and may contain, e.g., for each item, the "headline" or "title" of the item, the full content (e.g., article text) of the item, user comments (e.g., sequenced by time) posted for the item, and/or bylines and other data if available. In an exemplary embodiment, corpus 300 is used to train module 301 to generate a relevant comment based on a given item of online content, and further to train module 302 to generate relevant responses to user comments.

In particular, to train module 301, training signal 310a.1 is provided by corpus 310 to classifier 320 of module 301. Signal 310a.1 may include a plurality of corpus elements {item; comments}, corresponding to all comments associated with a single item. In an exemplary embodiment, the item can be characterized in signal 310a.1 by some distinctive field, e.g., only its headline. Classifier 320 classifies the quality of each comment in signal 310a.1. For example, a quality score of 1 (lowest quality) to 5 (highest quality) may be assigned to each comment.

In an exemplary embodiment, quality scores may be computed based on the indicators such as the number of "likes" a comment received, whether a particular comment generated a large quantity of positive discussion, whether a comment includes black-listed keywords (e.g., obscene or vulgar words), white-listed keywords, etc. It will be appreciated that any techniques may be applied to classify the quality of comments, e.g., techniques derived from machine learning, or rule-based techniques, and such techniques are contemplated to be within the scope of the present disclosure.

In addition to classification, for each item of online content, classifier 320 may also rank the associated comments according to their assigned quality score. Classifier 320 thus generates classifier signal 320a, which includes a plurality of training elements {item; highest quality comment}, e.g., the highest quality comment associated with each content item. Signal 320a is provided to comment generation trainer 330.

In an exemplary embodiment, trainer 330 includes a machine learning model or algorithm that is trained using classifier signal 320a to associate a high-quality comment given a news headline. Trainer 330 may incorporate machine learning techniques such as recurrent neural networks (RNN). In an exemplary embodiment, techniques used for automated translation of natural languages, or machine translation, may be incorporated in trainer 330. In a sense, the model parameters generated by trainer 330 may be understood to enable the personification engine 340 to "translate" an item, e.g., the headline of a news article, to a relevant comment, e.g., from a language of "news headlines" to a language of "comments."

Following training, trainer 330 provides the set of trained model parameters 330a to personification engine 340. Using model parameters 330a, engine 340 is configured to receive an arbitrary content item such as a news headline, and generate a high-quality comment associated with that item.

In particular, engine 340 may receive a signal 360c from content recommendation system 360. Signal 360c may include as one of its parameters the item of online content, e.g., a news headline. System 360 may itself receive as inputs user profiles 360a and input content items 360b. User profiles 360a may include an index of a plurality of users and corresponding profiles, with each profile specifying information about the user that may be useful in determining whether an item would be relevant to that user, or a group of users. For example, a user profile may include such information as gender, age, occupation, hobbies, recent websites visited, etc.

Input content items 360b may include updated items that are candidates for recommendation to one or more of the users represented by user profiles 360a. Items 360b may be provided by any online content source, e.g., an online news source.

When system 360 receives an input content item 360b, it determines which user subset of user profiles 360a may be considered a target user group to which the item can be recommended. To do this, system 360 may employ the information in the user profiles, and utilize techniques such as derived from machine learning, or rule-based algorithms, to identify the target users for a given item.

System 360 generates signal 360c, which includes a target user group and the relevant item, e.g., the title of a news item. Signal 360c is provided to engine 340. Based on model parameters 330a and signal 360c, engine 360 generates an artificial comment that is relevant to the item specified in 360c for the target user group also specified in 360c. The output signal 301a of engine 340 thus includes the target user group, recommended item such as news article, and generated artificial comment therefor.

Referring now to comment generation module 302, techniques are further described hereinbelow for training a chatbot engine to generate real-time responses to user comments, e.g., comments 224, 226 in FIG. 2. In particular, corpus 310 generates signal 310a.2 for classifier 325 in module 302. Signal 310a.2 may include a plurality of corpus elements in the form of {comment, reply}, e.g., each element may correspond to a pairing between a user comment and associated reply. Classifier 325 is configured to identify those pairings that may be classified as "high quality." In an exemplary embodiment, a particular {comment, reply} pair may be considered high quality if the reply is highly relevant to the comment. The judgment of relevance may be assessed using any factors, e.g., based on number of "likes" accorded to a reply, the presence of similar keywords between comment and associated reply, etc. Classifier 325 may perform its classification using, e.g., techniques derived from machine learning, or rule-based algorithms, etc. Classifier 325 generates signal 325a representing a plurality of elements {comment, reply} that are deemed to have high quality.

Signal 325a is further input to a response generation trainer 335. In an exemplary embodiment, trainer 335 includes a machine learning model or algorithm that is trained using signal 325a to generate a high-quality response to any given comment. Trainer 335 may incorporate machine learning techniques such as recurrent neural networks (RNN). In an exemplary embodiment, techniques used for automated translation of natural languages, or machine translation, may be incorporated in trainer 335. In a sense, the model parameters generated by trainer 335 may be understood to enable the chatbot engine 345 to "translate" a given comment into a relevant response.

Trainer 335 generates a set of trained model parameters 335a for chatbot engine 345, which is configured to accept real-time comments 345a from users as input. Responsive to comments 345a, engine 345 may thus generate a relevant response 302a to each comment in 345a, e.g., response 228 responsive to comment 226 in FIG. 2.

Figure 4:
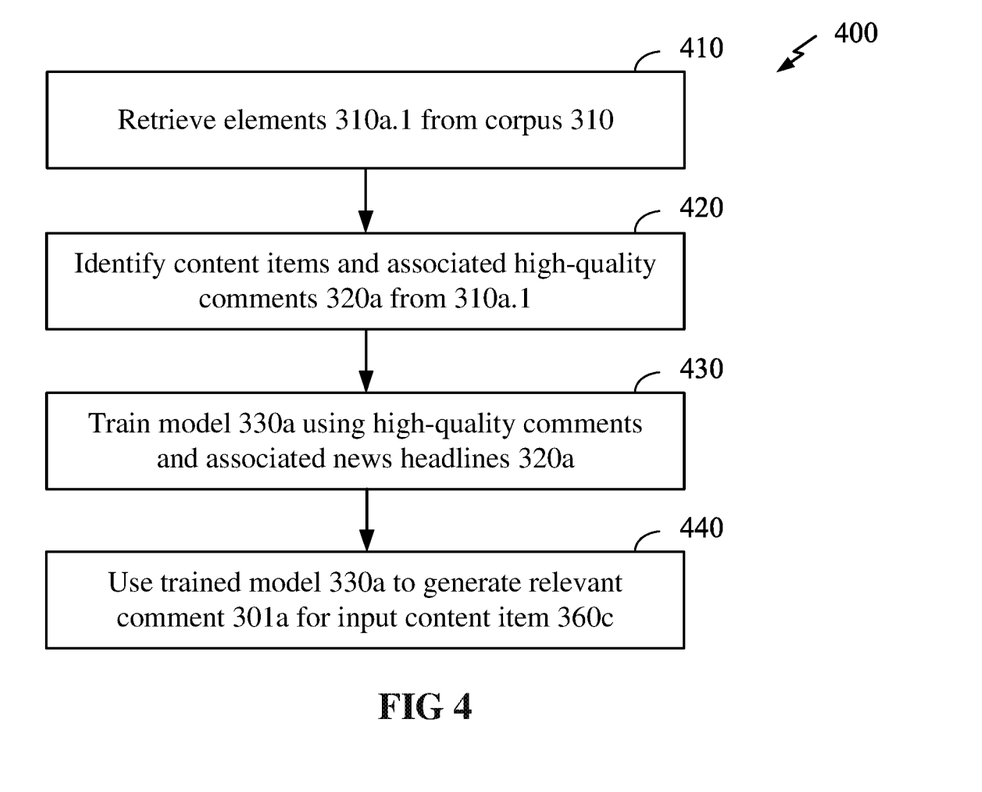
FIG. 4 illustrates an exemplary embodiment of a method for implementing an initial comment generation module according to the present disclosure.

FIG. 4 illustrates an exemplary embodiment of a method 400 for implementing an initial comment generation module 301 according to the present disclosure. Note FIG. 4 is shown for illustrative purposes only, and is not meant to limit the scope of the present disclosure.

In FIG. 4, at block 410, elements 310a.1 are retrieved from corpus 310.

At block 420, high-quality comments and associated items 320a are identified from elements 310a.1.

At block 430, model 330a is trained using the high-quality comments and associated items 320a.

At block 440, trained model 330a is used to generate relevant comments 301a for input content item 360c.

Figure 5:
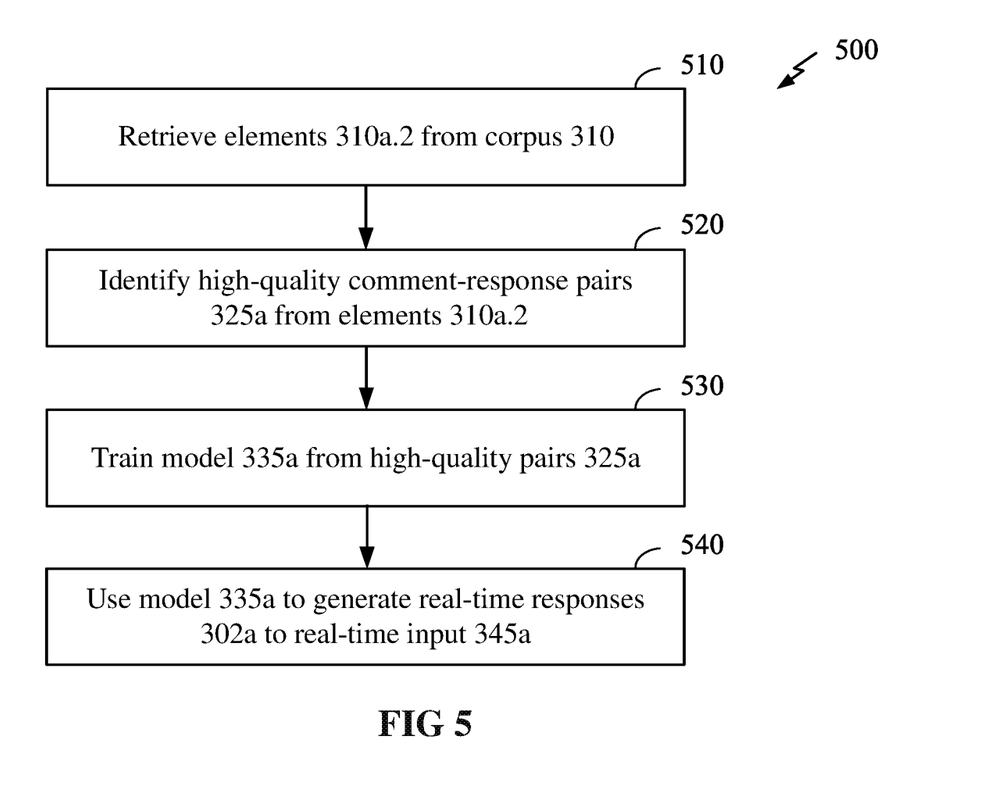
FIG. 5 illustrates an exemplary embodiment of a method for implementing a chatbot module according to the present disclosure.

FIG. 5 illustrates an exemplary embodiment of a method 500 for implementing a chatbot module 302 according to the present disclosure. Note FIG. 5 is shown for illustrative purposes only, and is not meant to limit the scope of the present disclosure.

In FIG. 5, at block 510, elements 310a.2 are retrieved from corpus 310.

At block 520, high-quality comment-response pairs 325a are identified from elements 310a.2.

At block 530, model 335a is trained using the high-quality pairs 325a.

At block 540, trained model 335a is used to generate relevant responses 302a for real-time inputs 345a.

Figure 6:
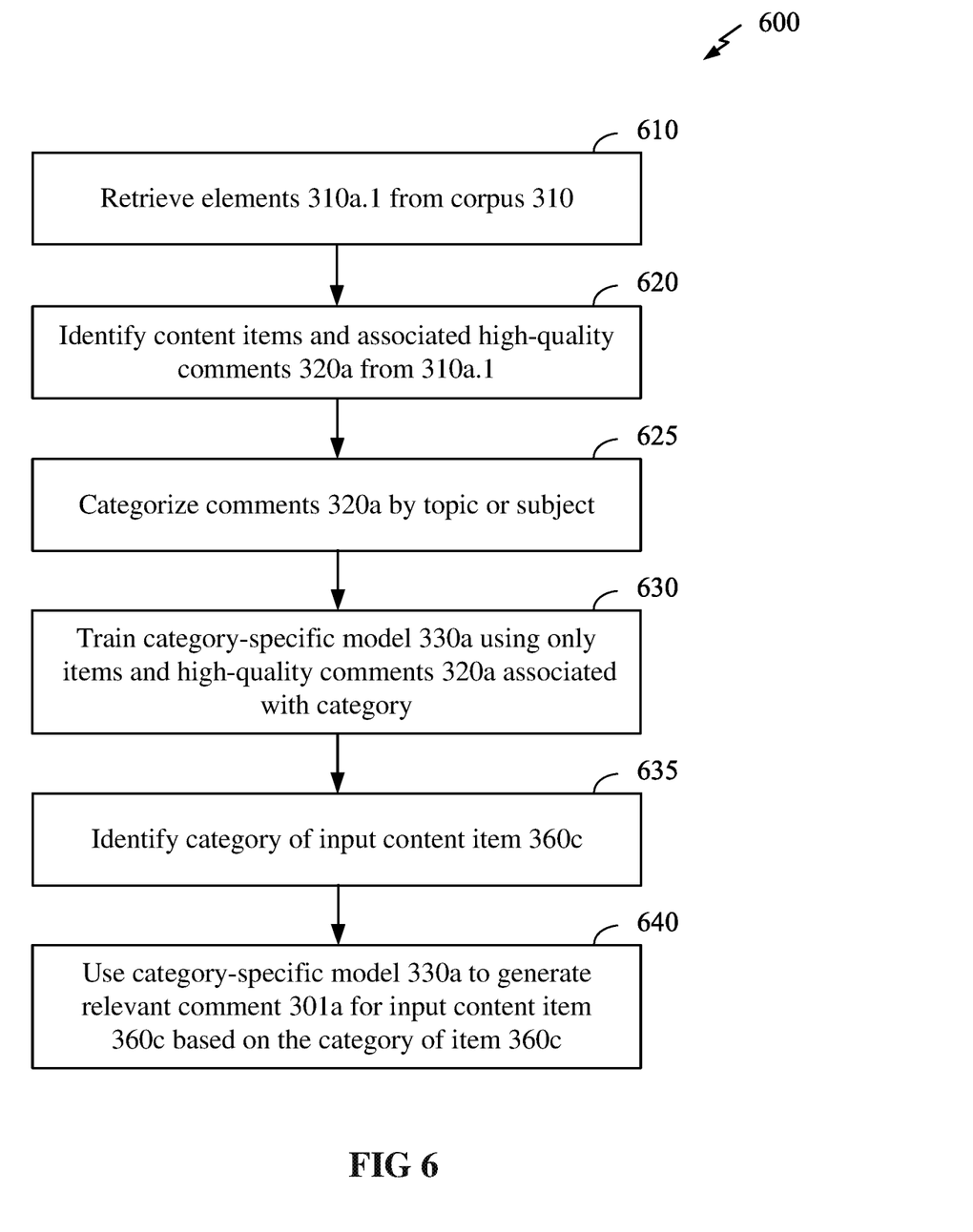
FIG. 6 illustrates an alternative exemplary embodiment of a method for implementing an initial comment generation module according to the present disclosure.

FIG. 6 illustrates an alternative exemplary embodiment of a method 600 for implementing an initial comment generation module 301 according to the present disclosure. Note FIG. 6 is shown for illustrative purposes only, and is not meant to limit the scope of the present disclosure.

In FIG. 6, at block 610, elements 310a.1 are retrieved from corpus 310.

At block 620, high-quality comments and associated items 320a are identified from elements 310a.1.

At block 625, high-quality comments 320a are categorized by topic or subject. Examples of categories include, but are not limited to, subject categories such as technology, politics, sports, entertainment, etc. Other examples may include, e.g., subjects or events such as health care reform, 2016 presidential election, European soccer league, etc.

In an exemplary embodiment, categorization of comments 320a by topic or subject may be performed by classifier 320 in FIG. 3. Thus classifier 320 may perform "content classification," in addition to "quality classification" as earlier described hereinabove with reference to FIG. 3.

At block 630, separate models may be trained and maintained for each category. In particular, category-specific models 330a may be trained using only high-quality comments and associated items 320a that are classified into that category, as determined at block 625.

At block 635, the news category of an input content item 360c is identified. In an exemplary embodiment, the identification of category for item 360c may be performed by recommendation system 360, e.g., using the same techniques used to identify a target user group 360a for an item 360b.

At block 640, the category-specific model 330a corresponding to the category of item 360c is used to generate a relevant comment 301a for item 360c.

Figure 7:
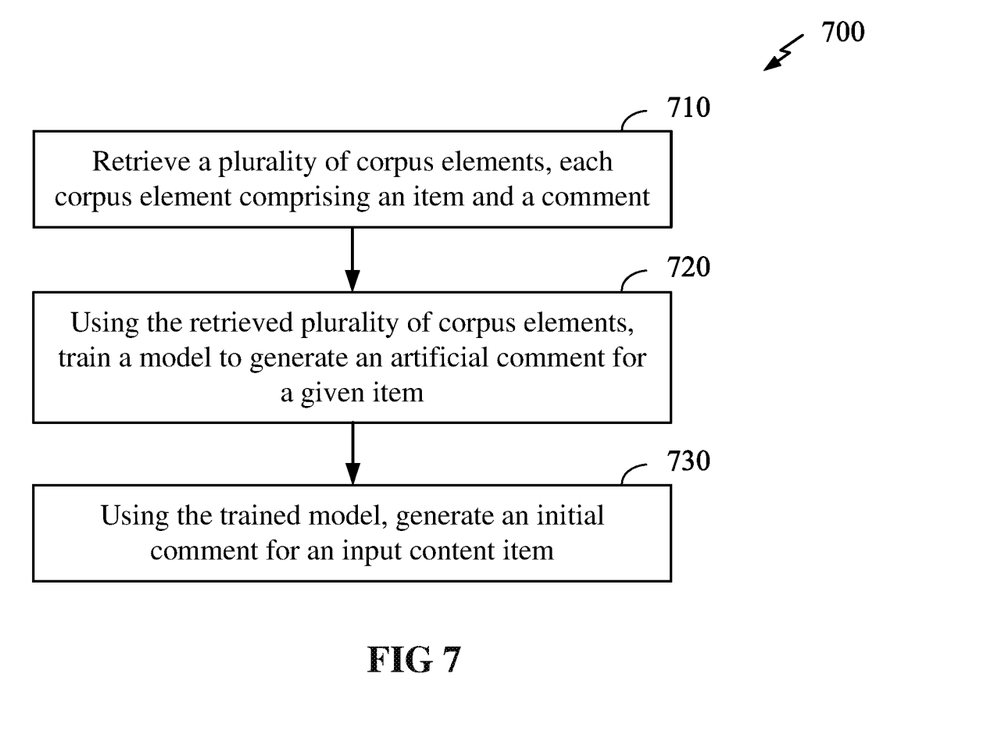
FIG. 7 illustrates an exemplary embodiment of a method according to the present disclosure.

FIG. 7 illustrates an exemplary embodiment of a method 700 according to the present disclosure. In FIG. 7, at block 710, a plurality of corpus elements is retrieved, each corpus element comprising an item and a comment. At block 720, using the retrieved plurality of corpus elements, a model is trained to generate an artificial comment for a given item. At block 730, using the trained model, an initial comment is generated for an input content item.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:
1. A method comprising:
   retrieving a plurality of corpus elements from a corpus, each of the plurality of corpus elements comprising a first content item and a first user comment for the first content item;

using the plurality of corpus elements, training a model to generate an artificial comment indicating a statement or opinion about a second content item received from a source other than the corpus;

assigning a category to each of the plurality of corpus elements, wherein training the model comprises training a separate model for each assigned category using only one or more corpus elements assigned to that category;

assigning a category to the second content item;

using the trained model with the assigned category of the second content item, generating the artificial comment for the second content item received from the source other than the corpus, the artificial comment being displayed to a human user to initiate a conversation about the second content item between an artificial personality and the human user; and sending a notification to a target user group to which the second content item is to be recommended, the notification comprising the second content item and the artificial comment.

2. The method of claim 1, wherein retrieving the plurality of corpus elements comprises dividing the plurality of corpus elements into a plurality of sets, each set of the plurality of sets being assigned a quality score based on a quality of the first user comment for an item in the set.

3. The method of claim 1, the training the model comprising training the model using a plurality of quality pairs, each quality pair consisting of a comment and a relevant reply to the comment, the relevant reply being based on a quantity of likes accorded thereto.

4. The method of claim 1, further comprising:
retrieving a plurality of chatbot corpus elements, each chatbot corpus element comprising a comment and associated response;
using the plurality of chatbot corpus elements, training a chatbot model to generate an artificial response for a given comment; and
using the trained chatbot model, generating a response for an input comment.

5. The method of claim 1, wherein the conversation includes a second user comment for the second content item, the second user comment being received from the human user.

6. The method of claim 5, wherein the second user comment indicates a real-time question or a real-time statement or opinion from the human user responsive to the statement or opinion indicated by the artificial comment.

7. The method of claim 5, wherein the artificial comment further initiates a conversation between different human users.

8. The method of claim 7, wherein the artificial comment precedes all comments by the different human users.

9. The method of claim 1, wherein the conversation pertains to a news article.

10. The method of claim 1, wherein the conversation pertains to a video.

11. The method of claim 1, wherein the conversation pertains to an image or a food recipe.

12. An apparatus comprising:
a memory and a processor, the processor being operationally coupled to the memory, and functioning as:
a classifier, that retrieves a plurality of corpus elements from a corpus, each of the plurality of corpus elements comprising first content item and a first user comment for the first content item;
a trainer, that uses the plurality of corpus elements to train a model to generate an artificial comment indicating a statement or opinion about a second content item received from a source other than the corpus, assigns a category to each of the plurality of corpus elements, and assigns a category to the second content item, wherein training the model comprises training a separate model for each assigned category using only one or more corpus elements assigned to that category; and
a personification engine that, using the trained model with the assigned category of the second content item, generates the artificial comment for the second content item received from the source other than the corpus and that sends a notification to a target user group to which the second content item is to be recommended, the notification comprising the second content item and the artificial comment, the initial artificial comment being displayed to a human user to initiate a conversation about the second content item between an artificial personality and the human user.

13. The apparatus of claim 12, wherein the processor functions as the classifier and retrieves the plurality of corpus elements at least by dividing the plurality of corpus elements into a plurality of sets, each set of the plurality of sets being assigned a quality score based on a quality of the first user comment for an item in the set.

14. The apparatus of claim 12, the processor functions as trainer and further trains the model using a plurality of quality pairs, each quality pair consisting of a comment and a relevant reply to the comment, the relevant reply being based on a quantity of likes accorded thereto.

15. The apparatus of claim 12, further comprising:
retrieving a plurality of chatbot corpus elements, each chatbot corpus element comprising a comment and associated response;
using the plurality of chatbot corpus elements, training a chatbot model to generate an artificial response for a given comment; and
using the trained chatbot model, generating a response for an input comment.

16. The apparatus of claim 12, wherein the conversation pertains to a news article, a video, an image, or a food recipe.

17. A computing device including a processor and a memory holding instructions executable by the processor to:
retrieve a plurality of corpus elements from a corpus, each of the plurality of corpus elements comprising a first content item and a first user comment for the first content item;
using the plurality of corpus elements, train a model to generate an artificial comment indicating a statement or opinion about a second content item received from a source other than the corpus; and
assign a category to each of the plurality of corpus elements, wherein training the model comprises training a separate model for each assigned category using only one or more corpus elements assigned to that category;
assign a category to the second content item;
using the trained model with the assigned category of the second content item, generate the artificial comment for the second content item received from the source other than the corpus, the artificial comment being displayed to a human user to initiate a conversation about the second content item between an artificial personality and the human user; and send a notification to a target user group to which the second content item is to be recommended, the notification comprising the second content item and the artificial comment.

18. The computing device of claim 17, training the model comprising training the model using a plurality of quality pairs, each quality pair consisting of a comment and a relevant reply to the comment, the relevant reply being based on a quantity of likes accorded thereto.

19. The computing device of claim 17, wherein the conversation pertains to one or more of: a news article, a video, an image, or a food recipe.

20. The computing device of claim 17, wherein generating the artificial comment comprises generating the artificial comment for the second content item based on a user profile.

* * * * *